US008250618B2

(12) United States Patent
Rosenzweig et al.

(10) Patent No.: US 8,250,618 B2
(45) Date of Patent: Aug. 21, 2012

(54) REAL-TIME NETWORK ADAPTIVE DIGITAL VIDEO ENCODING/DECODING

(75) Inventors: Jesse J. Rosenzweig, Portland, OR (US); Michael J. West, Portland, OR (US); Samuel Blackman, Portland, OR (US)

(73) Assignee: Elemental Technologies, Inc., Portland, OR (US)

( * ) Notice: Subject to any disclaimer, the term of this patent is extended or adjusted under 35 U.S.C. 154(b) by 521 days.

(21) Appl. No.: 11/857,424

(22) Filed: Sep. 18, 2007

(65) Prior Publication Data

US 2008/0084927 A1 Apr. 10, 2008

Related U.S. Application Data

(60) Provisional application No. 60/826,008, filed on Sep. 18, 2006.

(51) Int. Cl.
*H04N 7/173* (2011.01)
*H04N 7/12* (2006.01)

(52) U.S. Cl. ............. 725/96; 375/240.02; 375/240.12; 375/240.26

(58) Field of Classification Search ............ 725/93, 725/94, 95, 96, 98, 116, 118; 375/240.12, 375/240.13
See application file for complete search history.

(56) References Cited

U.S. PATENT DOCUMENTS

| | | | |
|---|---|---|---|
| 5,280,349 A | 1/1994 | Wang | |
| 5,414,468 A | 5/1995 | Lee | |
| 5,557,332 A | 9/1996 | Koyanagi | |
| 5,565,920 A | 10/1996 | Lee et al. | |
| 5,675,331 A | 10/1997 | Watanabe | |
| 5,699,460 A | 12/1997 | Kopet | |
| 5,963,260 A | 10/1999 | Bakhmutsky | |
| 6,058,143 A | 5/2000 | Golin | |
| 6,434,196 B1 | 8/2002 | Sethuraman | |
| 6,504,872 B1 | 1/2003 | Fimoff et al. | |
| 6,577,767 B2 | 6/2003 | Lee | |
| 6,587,590 B1 | 7/2003 | Pan | |
| 6,771,704 B1 | 8/2004 | Hannah | |
| 6,870,883 B2 | 3/2005 | Iwata | |
| 6,888,477 B2 | 5/2005 | Lai | |
| 6,952,211 B1 | 10/2005 | Cote | |
| 7,339,993 B1 | 3/2008 | Brooks | |
| 7,376,590 B2 | 5/2008 | Lee | |

(Continued)

FOREIGN PATENT DOCUMENTS

JP 2004140473 A 5/2004

(Continued)

OTHER PUBLICATIONS

Tambankar et al., "An overview of H.264/MPEG-4 part 10," Jul. 2, 2003.

(Continued)

*Primary Examiner* — Brian Pendleton
*Assistant Examiner* — Jason K Lin
(74) *Attorney, Agent, or Firm* — Stolowitz Ford Cowger LLP

(57) ABSTRACT

A method for real time video transmission over networks with varying bandwidth is described. Image quality is maintained even under degrading network performance conditions through the use of image scaling in conjunction with block based motion compensated video coding (MPEG2/4, H.264, et. Al.). The ability to quickly switch resolutions without decreasing reference frame correlation is shown enabling a fast switch to reduce the required bandwidth for stable image quality.

25 Claims, 4 Drawing Sheets

U.S. PATENT DOCUMENTS

| | | | |
|---|---|---|---|
| 7,634,776 B2 | 12/2009 | Parameswaran | |
| 7,646,810 B2 | 1/2010 | Tourapis | |
| 2001/0047517 A1 | 11/2001 | Christopoulos et al. | |
| 2002/0064314 A1* | 5/2002 | Comaniciu et al. | 382/239 |
| 2002/0136298 A1* | 9/2002 | Anantharamu et al. | 375/240.12 |
| 2002/0157112 A1 | 10/2002 | Kuhn | |
| 2003/0028643 A1 | 2/2003 | Jabri | |
| 2003/0123748 A1 | 7/2003 | Sebot | |
| 2004/0076333 A1 | 4/2004 | Zhang et al. | |
| 2004/0101056 A1 | 5/2004 | Wong | |
| 2004/0161035 A1 | 8/2004 | Wedi | |
| 2004/0213345 A1* | 10/2004 | Holcomb et al. | 375/240.03 |
| 2004/0218673 A1* | 11/2004 | Wang et al. | 375/240.12 |
| 2004/0252901 A1 | 12/2004 | Klein Gunnewiek et al. | |
| 2005/0019000 A1 | 1/2005 | Lim et al. | |
| 2005/0091696 A1* | 4/2005 | Wolfe et al. | 725/116 |
| 2005/0134735 A1* | 6/2005 | Swartz | 348/554 |
| 2005/0147033 A1* | 7/2005 | Chin et al. | 370/229 |
| 2005/0160471 A1* | 7/2005 | Cohen | 725/116 |
| 2005/0262510 A1 | 11/2005 | Parameswaran | |
| 2006/0018378 A1* | 1/2006 | Piccinelli et al. | 375/240.03 |
| 2006/0056513 A1 | 3/2006 | Shen | |
| 2006/0083308 A1 | 4/2006 | Schwarz et al. | |
| 2006/0093042 A1 | 5/2006 | Kashima | |
| 2006/0095944 A1* | 5/2006 | Demircin et al. | 725/81 |
| 2006/0114989 A1 | 6/2006 | Panda | |
| 2006/0126667 A1* | 6/2006 | Smith et al. | 370/486 |
| 2006/0193388 A1 | 8/2006 | Woods | |
| 2006/0268991 A1 | 11/2006 | Segall et al. | |
| 2007/0053436 A1 | 3/2007 | Van Eggelen | |
| 2007/0086528 A1 | 4/2007 | Mauchly | |
| 2007/0091815 A1* | 4/2007 | Tinnakornsrisuphap et al. | 370/252 |
| 2007/0098070 A1 | 5/2007 | Saigo | |
| 2007/0223580 A1 | 9/2007 | Ye | |
| 2007/0285285 A1 | 12/2007 | Puri | |
| 2008/0063082 A1 | 3/2008 | Watanabe | |
| 2008/0123750 A1 | 5/2008 | Bronstein | |
| 2008/0126278 A1 | 5/2008 | Bronstein | |
| 2009/0034856 A1 | 2/2009 | Moriya | |
| 2009/0092326 A1 | 4/2009 | Fukuhara | |
| 2009/0290635 A1* | 11/2009 | Kim et al. | 375/240.02 |

FOREIGN PATENT DOCUMENTS

| | | |
|---|---|---|
| JP | 2007174569 A | 7/2007 |
| WO | 03036980 | 5/2003 |
| WO | WO 2004010670 A1 * | 1/2004 |

OTHER PUBLICATIONS

Blaszak et al., "Scalable AVC Codec," Mar. 6, 2004.

Wedi, "Advanced motion compensated prediction methods," Oct. 18, 2003.

Wedi, "New Results on Adaptive Interpolation Filter," May 10, 2002.

Schwarz et al., "SVC Core Experiment 2.1: Inter-layer prediction of motion and residual data," Jul. 14, 2004.

Teng et al., "Design and Evaluation of mProducer: a Mobile Authoring Tool for Personal Experience Computing"; Oct. 27-29, 2004; 8 pgs.

Thinh M. Le et al. SMID Processor Arrays for Image and Video Processing: A Review, Multimedia Hardware Architectures, 1998, vol. 3311 of SPIE Proceedings (http://www.doe.carleton.ca~thinh/./papers/mha98/array98.ps).

* cited by examiner

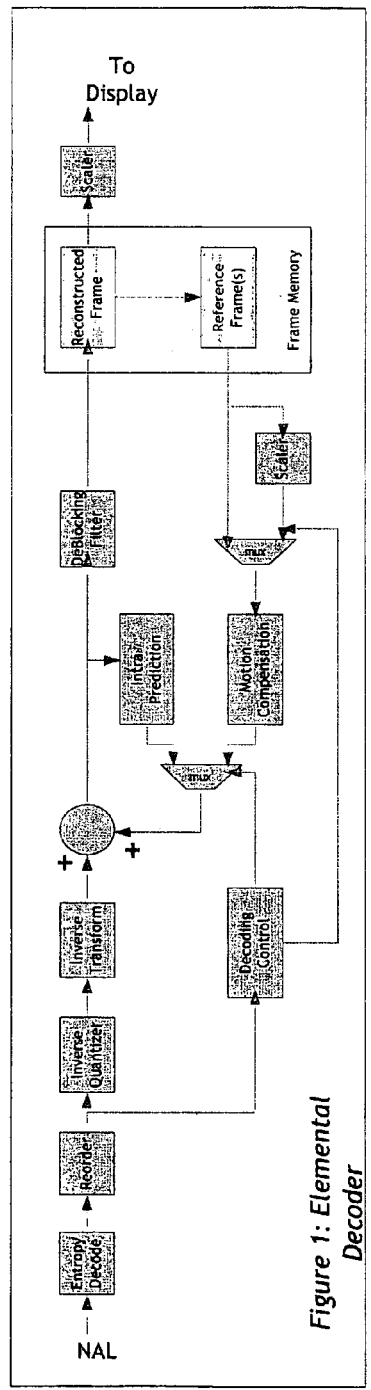
Figure 1: Elemental Decoder
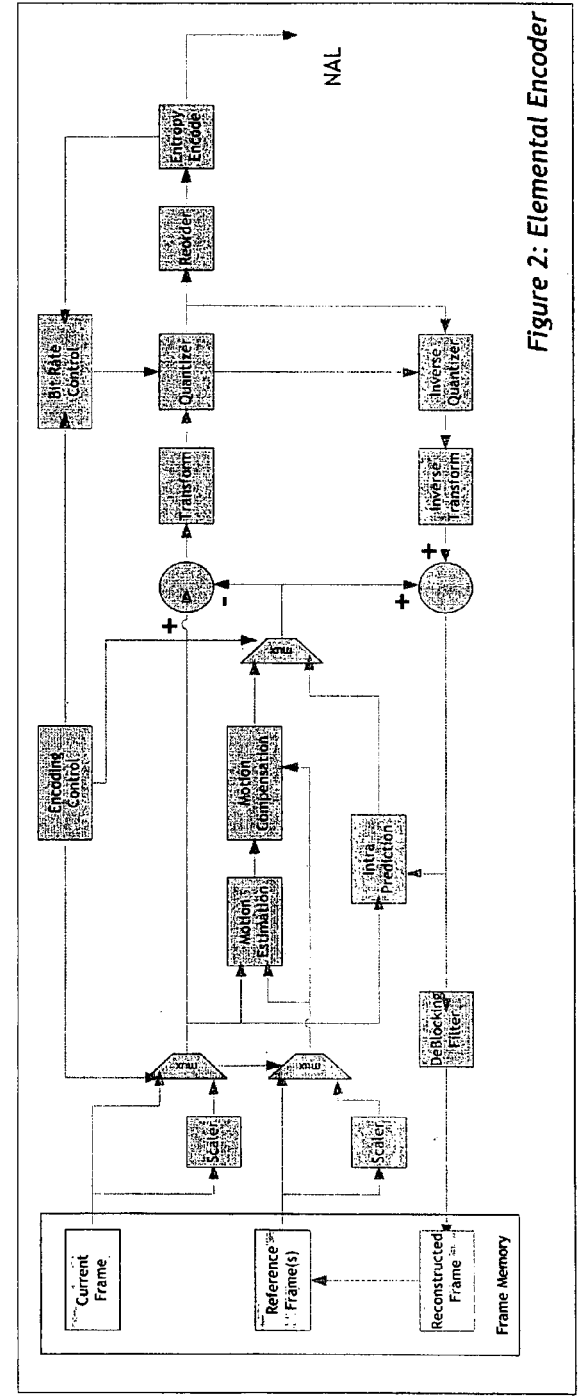
Figure 2: Elemental Encoder

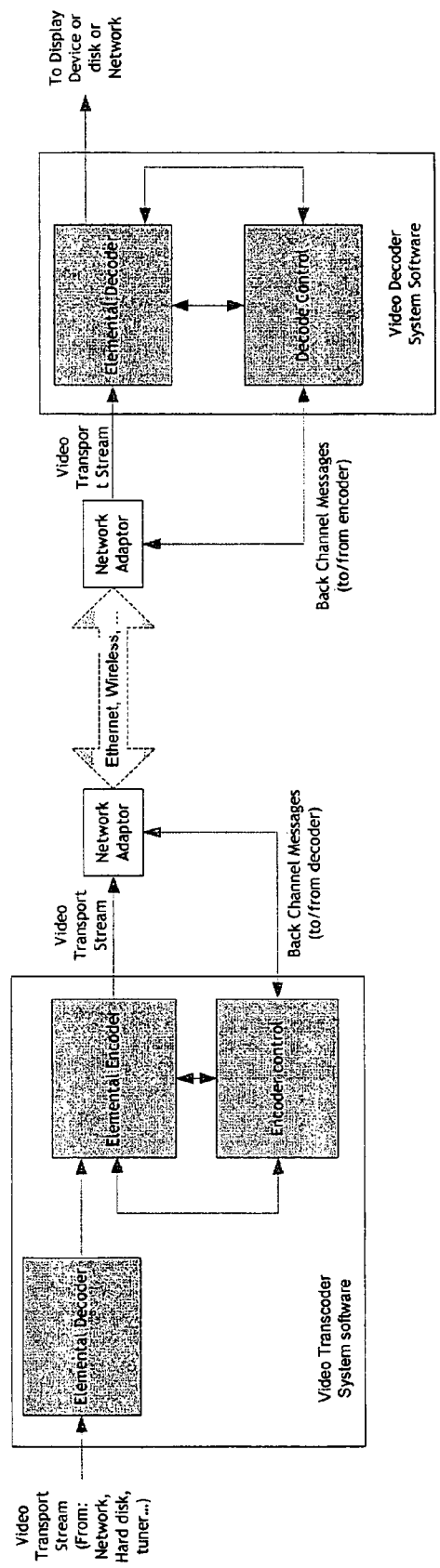
Figure 3: Network Aware Video Streaming System Diagram

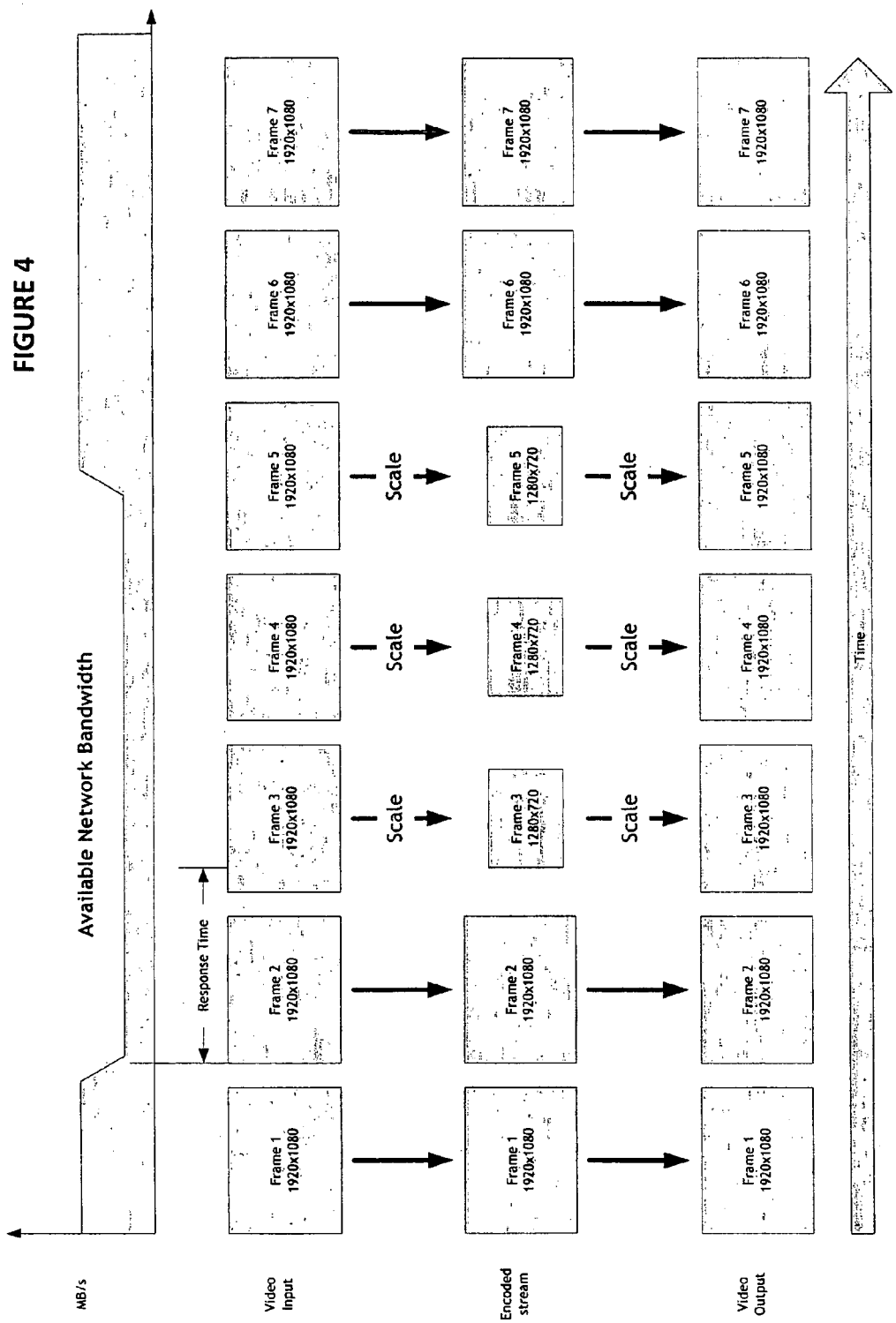

REAL-TIME NETWORK ADAPTIVE DIGITAL VIDEO ENCODING/DECODING

RELATED APPLICATIONS

This application claims priority from U.S. Provisional Application No. 60/826,008 filed Sep. 18, 2006 and incorporated herein by this reference.

COPYRIGHT NOTICE

© 2006-2007 Elemental Technologies, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to methods and apparatus for real-time digital video transmission over a network, and more specifically to adapting to variations in the network bandwidth while optimizing image quality.

BACKGROUND OF THE INVENTION

For in the home consumer video applications (TV) quality of service is critical, image breakup, stalling or other artifacts are not acceptable for the market/customer. This presents a serious problem for network based distribution of video in the home, in that the available bandwidth in these networks tends to be unstable/unpredictable. Changing available bandwidth can cause the client devices to fall behind and eventually run out of data for display resulting in the aforementioned issues. Wireless and home-plug based networks are particularly sensitive to this issue because of interference from other devices inside (and outside) the home. However, even if Ethernet or Fiber is available (very rare) changes in network demand based on user usage can cause the same issues. For instance transferring large files or printing while simultaneously streaming video often creates a network bottleneck which the video cannot recover from without visible artifacts.

Most current approaches use a constant bit rate (or near constant) for network video transmission, which requires the smallest available bandwidth to be known prior to initiating the video stream. Since bit rate (bandwidth) and image quality are highly correlated with higher bit rates resulting in better quality, selecting the lowest possible bandwidth will result in the lowest image quality. Even in the case where variable bit rate technology is used it must maintain over the long term a rate that matches the worst case network conditions using today's technology.

The need remains therefore for a way to dynamically adapt to the available network bandwidth so as to optimize image quality.

SUMMARY OF THE INVENTION

Our solution in a preferred embodiment dynamically adapts to the available bandwidth by down-scaling the video image (frames/fields) prior to encoding and transmission. As less bandwidth becomes available, the video is down-scaled by increasing amounts, and conversely when more bandwidth is available, the scaling factor is reduced. Normally, changing the input resolution to an encoder would result in loss of correlation to the already stored reference frames; however, because we also scale the reference frames prior to intra or inter predication, correlation is maintained. Since the lower resolution frames require fewer blocks the overall data rate per frame is reduced.

Additionally, high quality polyphase based image scaling preferably is used which low pass filters the image, thereby reducing aliasing and high frequency content and resulting in better compression at the expense of image sharpness. The scale factor for each image is encoded in the bit stream on a frame by frame basis allowing the decoder to reconstruct the image and maintain a consistent output resolution.

It is to be understood that both the foregoing general description and following more detailed description are exemplary and explanatory only and are not restrictive of the invention as claimed. The accompanying drawings, which are incorporated in a constitute a part of the specification, illustrate an embodiment of the invention and together with the general description, serve to explain rather than limit the principles of the invention.

BRIEF DESCRIPTION OF THE DRAWINGS

FIG. 1 is a simplified block diagram illustrating a video decoder consistent with embodiments of the present invention.

FIG. 2 is a simplified block diagram illustrating a video encoder consistent with embodiments of the present invention.

FIG. 3 is a simplified block diagram illustrating one embodiment of a network bandwidth aware video streaming system consistent with the present invention.

FIG. 4 is a simplified illustration of a network adaptive scaling process consistent with one aspect of the present invention.

DETAILED DESCRIPTION OF PREFERRED EMBODIMENTS

Figure 5:
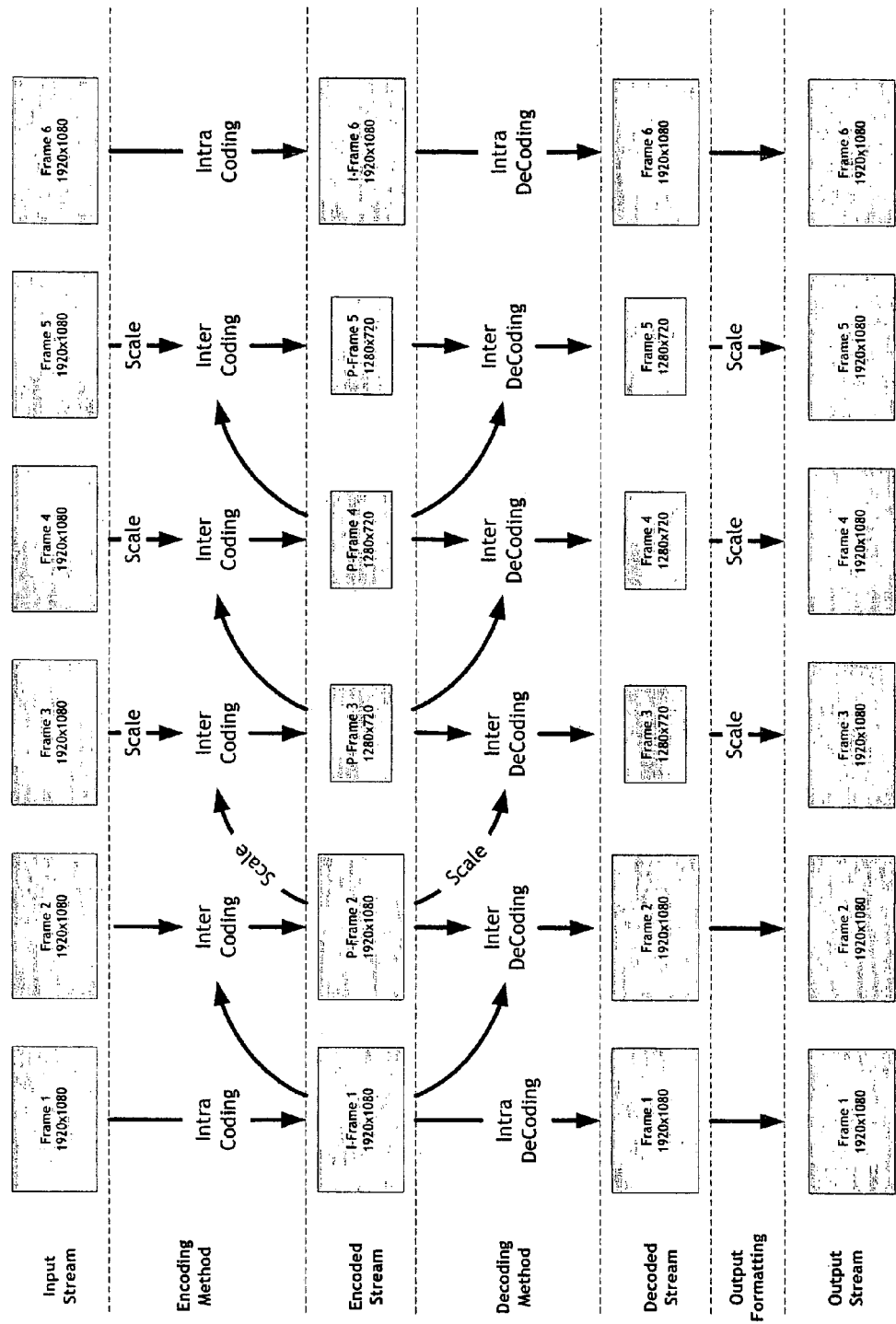
FIG. 5 is a simplified process flow diagram illustrating one example of an encoding/decoding process in accordance with one embodiment of the invention.

FIGS. 1 and 2 shows a block diagram of the elemental encoder and decoder. Scalers are introduced into a standard H.264 encoder and decoder at the output of the reference frames and current frame to be encoded to allow for dynamic scaling at any time during the streaming process.

FIG. 3 shows a system block diagram of the network adaptive encoder/decoder streaming pair. The encoding gets its video stream from a hard disk, tv tuner, or the internet and begins encoding it for the client decoder, at the same time, the encoder is monitoring the backchannel from the client (s). As network conditions change, messages are sent back from the client about quality of the network and the encoder then adapts the video as necessary.

FIG. 3 thus illustrates the communication backchannel from the Decoder to the Encoder. When the decoder detects that its buffers are running low (programmable threshold) it sends a message over the network (for example an IP packet) which signals the encoder to reduce its bit rate. The encoder then decides if increased quantization or image downscaling is the preferable method using a decision required amount of bit rate reduction and the current quantization level. If the current quantization level is low and the required rate reduction is small, then increasing the quantization level is selected; otherwise the image in downscaled by an amount based on K*P where K is a programmable value and P is the percent bit rate reduction required.

Alternately, the scaling factor can be derived from a look-up table index by P which allows for non-linear changes in the image scale factor. Since the back channel communications is through the host processor of each device (i.e., Encoder and Decoder) even more complex software based decision algorithms are possible which take into account the latency in the network. In fact the calculation of P by the encoders host processor must take into account the current data rate, decoder's current buffer depth, network latency, and response time. The current data rate (from the decoder's point of view) and decoder buffer depth are values sent from the decoder to the encoder in the back channel IP message. The decoder's view of the data rate is required because there may be buffering in the network infrastructure that masks the encoder from seeing the true data rate. Additionally the network latency can be determined by the encoder (for the backchannel) and the decoder (for the video stream) by comparing timestamp's of when data is sent vs. received. FIG. 4 illustrates this network adaptive scaling process.

FIG. 4 shows an example of high definition frames as they move from the encoder to the decoder in a streaming system. As network bandwidth drops, the encoder will react by either quantizing or in this case, scaling the image before encoding it. The response time of the encoder displayed here is a little more than one frame time. When the decoder and encoder agree that scaling is taking place, through use of extended data in the picture header in the bitstream, the input video resolution is the same as the output resolution. Less bits are required to send the video due to pre-scaling the video on the encoder side, and scaling back to the original side on the decoder side.

While in FIG. 4 we show the entire image being scaled this is not a requirement, in fact the scaling decision can be made on a block by block or region by region basis at the expense of needing to communicate and keep track of all the scaling information. One simple technique that minimizes the amount of scaling information is to use only a single scaling factor and send a single bit for each block/region which indicates if it is to be scaled or not. Using this technique image quality can be improved because regions with high levels of detail that compress efficiently can remain un-scaled, and areas which do not compress are scaled to decrease the bit rate. One possible disadvantage of this technique is that block artifacts may be increased. An alternate (and preferred) approach is to non-linearly scale the image with greater downscaling occurring at the periphery and little scaling in the image center. This is similar to the technique used to convert 16:9 aspect ratio video into 4:3.

As was mentioned earlier in addition to scaling the input frame (image) to the encoder, scaling of reference frames also occurs. This is required because when the scale factor is changed the reference frames used by the encoder are in the original (or last) format (i.e, size). This requires that they be scaled to match the input resolution prior to searching for motion (inter prediction). Once the encoder has switched to the new downscaled resolution its reference frame buffer will fill with the scaled frame data, this is done so that the encoder's reference data matches the decoder's data thereby allowing the decoder to accurately reconstruct its output frames. This presents a problem of loss of reference frame correlation when the scale factor wants to be reduced (i.e., less downscaling) or eliminated. This occurs because the high frequency content of the image has been reduced in the scaling process, so when the reference frame is scaled up to match the new input resolution it will have less detail than you have in the scaled original source. Fortunately this case occurs when more bandwidth has become available which means a simple solution is to insert an intra coded I-Frame (or simply wait until the next point in time when this would be done, usually about 4 times per second) which does not depend on any of the reference frames. A more complex approach would be to attempt to perform inter prediction and if the correlation is good (i.e., low PSNR) then immediately switch to the new resolution, otherwise, use the I-frame approach.

FIG. 5 is a detailed view of the process required when scaling is introduced during an inter-coded frame such as a P or a B frame. Reference frames must be scaled on the encoder and the decoder (decoder not shown) as they will be referenced by the input P or B frame. This example only shows I and P frames, but B frames would also work this way. FIG. 5 gives an example of the entire process from encoding to decoding and output formatting. The methods used and resulting frame resolution are shown. For simplicity in this example only I frames and P frames are shown, B frames which use inter prediction of previous and/or future references frames are not shown, however, the process is basically the same with the exception that depending on circumstances two scalers are required to convert the two reference frames to the correct resolution.

Some of the benefits of embodiments of the present invention include the following:

Maintains highest possible video quality given the available network bandwidth.

The bandwidth throttling transition is imperceptible to the view under most network conditions (i.e., assuming the network still has a minimum level of performance).

For multiple networks with multiple video streams this technology allows each stream to have optimized image quality, and when new streams are introduced the resulting loss of bandwidth can be shared across all the other video streams in a way that is imperceptible to the viewer.

In addition to real time encoding/decoding, the disclosed technology could be used for offline encoding with the result of reduced file size (data size) and/or higher quality image performance during scenes which have fast motion or for some other reason do not compress well. This would be particularly true for cases where a constant bit rate is desired.

It will be obvious to those having skill in the art that many changes may be made to the details of the above-described embodiments without departing from the underlying principles of the invention. The scope of the present invention should, therefore, be determined only by the following claims.

The invention claimed is:

1. A method for digital video transmission over a network, the method comprising:

receiving an unencoded video input stream for transmission;

encoding a portion of the unencoded video input stream using an encoder, for transmission over the network, wherein for said encoding at least one frame of the unencoded video input stream is input into the encoder with a first pixel count, resulting in encoded frame data and at least one reconstructed frame;

detecting a reduction in currently available network bandwidth;

in response to detecting the reduction in the currently available network bandwidth, downscaling at least one first subsequent frame of the unencoded video input stream according to a second pixel count that is lower than the first pixel count, prior to passing the first subsequent frame to the encoder, and downscaling all required reference frames stored in frame memory that are required based on the first subsequent frame to the second pixel count;

passing, to the motion compensation section of the encoder, the first subsequent frame with the second pixel count and the required reference frame(s) with the second pixel count;

encoding the first subsequent frame having the second pixel count using the encoder;

detecting a recovery in the currently available network bandwidth;

in response to detecting the recovery in the currently available network bandwidth, passing at least one second subsequent frame of the unencoded video input stream to the encoder, wherein the second subsequent frame is received by the encoder with the first pixel count, and scaling the reference frames to the first pixel count for passing to a motion compensation section of the encoder;

communicating a scaling factor used in said downscaling across the network for use in decoding at least said encoding of the first subsequent frame having the second pixel count.

2. The method of claim 1, further comprising:

imposing a delay after detecting the reduction in currently available network bandwidth and before encoding the first subsequent frame, the delay corresponding to an amount of time between the detection and a time corresponding to an occurrence of an independently decodable frame in the unencoded video input stream.

3. The method of claim 1, further comprising:

detecting an increase in currently available network bandwidth;

upscaling a third subsequent frame in response to detecting the increase; and inserting an independently decodable frame into an image scaler, the independently decodable frame inserted at an encoding transition point and with upscaling according to an upscaling factor.

4. The method of claim 1, wherein the scaling factor causes images from the unencoded video input stream to be downscaled by the product of a predefined programmable amount and a percentage, prior to encoding said images.

5. The method of claim 4, further comprising:

selecting the percentage responsive to detecting the reduction in currently available network bandwidth.

6. The method of claim 1, further comprising:

determining a current buffer depth of a decoding buffer used by a decoder; and selecting the scaling factor according to the determined current buffer depth of the decoding buffer.

7. The method of claim 1, further comprising:

receiving over the network a current data rate observed by a decoder; and selecting the scaling factor according to the current data rate observed at the decoder.

8. The method of claim 1, further comprising:

comparing first timestamps indicating when encoded data is transmitted from an encoding network device to second timestamps indicating when the encoded data is received by a decoding network device; and selecting the scaling factor according to the comparison.

9. An apparatus, comprising:

a scaler configured to resize an image, wherein an image output from the scaler has a different resolution than an image input into the scaler; and a device coupled to the scaler, the device configured to receive an unencoded video input stream for transmission across a network;

encode a first portion of the unencoded video input stream for transmission over the network to a decoder, resulting in encoded frame data and at least one reconstructed frame;

wherein the encoding of the first portion corresponds to a first pixel count;

detect a change in network conditions that indicates a reduced capacity to deliver information to the decoder over the network;

in response to detecting the change in network conditions that indicates the reduction, encode a downscaled image output from the scaler with a second pixel count that is lower than the first pixel count, the downscaled image output from the scaler corresponding to a second portion of the unencoded video input stream, and downscaling all required reference frames stored in frame memory that are required based on the downscaled image to the second pixel count;

pass, to the motion compensation section of the encoder, the downscaled image with the second pixel count and the required reference frame(s) with the second pixel count;

encode a second portion of the unencoded video input stream, where the encoding of the second portion corresponds to the second pixel count;

detect a change in network conditions that indicates a recovery in the capacity to deliver information to the decoder over the network;

in response to detecting the change in network conditions that indicates the recovery, encode a third portion of the unencoded video input stream, wherein the encoded third portion corresponds to the first pixel count, and scaling the reference frames to the first pixel count for passing to a motion compensation section of the encoder;

encode the third portion of the unencoded video input stream, wherein the encoding of the third portion corresponds to the first pixel count;

transmit the encodings over the network for delivery at the decoder; and communicate a scaling factor used in said downscaling across the network for use in decoding at least said encoding of the first subsequent frame having the second pixel count.

10. The apparatus of claim 9, wherein the device is configured to:

upscale a frame of the unencoded video input stream in response to detecting a change in network conditions that indicates an increase in the capacity to deliver information to the decoder over the network; and if the upscaled frame is a P or B frame dependent on an I-frame that is of the unencoded video input stream and before the upscale transition point, encode the I-frame at least a first time without said upscaling and a second time with said upscaling.

11. The apparatus of claim 9, wherein the device is configured to:

determine a buffer depth of a decoding buffer used by a decoding endpoint;

determine a data rate observed by the decoding endpoint;

determine network latency between an encoding endpoint and the decoding endpoint; and select, according to the buffer depth, the observed data rate, and the network latency, a ratio to be applied to a resolution of the image to determine a resolution to obtain by downscaling.

12. The apparatus of claim 9, wherein said downscaled portion of the unencoded video input stream and a previous portion of the unencoded video input stream are encoded using the same encoding standard.

13. The apparatus of claim 9, wherein the transmitted encodings includes at least one image having a resolution corresponding to a first High Definition TeleVision (HDTV) standard and at least one other image corresponding to a second different HDTV standard.

14. The apparatus of claim 9, wherein the device is configured to:
after detecting the change in the network conditions that indicates the capacity reduction, encode the periphery of an image in the unencoded video input stream with downscaling while continuing to encode a center of the image without downscaling.

15. The apparatus of claim 9, wherein the device is configured to:
after detecting the change in the network conditions that indicates the capacity reduction, encode only a portion of an image in the unencoded video input stream with downscaling while continuing to encode other portions of the image without downscaling.

16. The method of claim 1, wherein the encoder is a block based encoder.

17. The method of claim 16, wherein the encoder is an H.264 or Moving Picture Experts Group (MPEG) encoder.

18. The apparatus of claim 9, wherein the scaler is integrated into an input side of a block based encoder.

19. The apparatus of claim 18, where the block based encoder is an H.264 or Moving Picture Experts Group (MPEG) encoder.

20. A method, comprising:
receiving an unencoded video input stream for transmission;
encoding a portion of the unencoded video input stream using an encoder, for transmission over a network, wherein for said encoding at least one frame of the unencoded video input stream is input into the encoder with a first pixel count, resulting in encoded frame data and at least one reconstructed frame;
detecting a reduction in the currently available network bandwidth;
in response to detecting the reduction in the currently available network bandwidth, causing a downscaled version of at least one first subsequent frame of the unencoded video input stream to be passed to the encoder, the downscaled version of the at least one first subsequent frame having a second pixel count that is lower than the first pixel count, and downscaling all required reference frames stored in frame memory that are required based on the first subsequent frame to the second pixel count;
passing, to the motion compensation section of the encoder, the first subsequent frame with the second pixel count and the required reference frame(s) with the second pixel count;
encoding the downscaled version of the first subsequent frame using the encoder;
detecting a recovery in the currently available network bandwidth;
in response to detecting the recovery in the currently available network bandwidth, passing at least one second subsequent frame of the unencoded video input stream to the encoder, wherein the second subsequent frame is received by the encoder with the first pixel count, and scaling the reference frames to the first pixel count for passing to a motion compensation section of the encoder; and
communicating a scaling factor used in said downscaling across the network for use in decoding at least said encoding of the first subsequent frame having the second pixel count.

21. The method of claim 20, further comprising:
imposing a delay after detecting the reduction in the currently available network bandwidth and before encoding the downscaled frames, the delay corresponding to an amount of time between the detection and a time corresponding to an occurrence of an independently decodable frame in the unencoded video input stream.

22. The method of claim 20, wherein the scaling factor causes images from the unencoded video input stream to be downscaled by the product of a predefined programmable amount and a percentage, prior to encoding said images.

23. The method of claim 22, further comprising:
selecting the percentage responsive to detecting the reduction in the currently available network bandwidth.

24. The method of claim 20, further comprising:
receiving over the network a current data rate observed by a decoder; and
selecting the scaling factor according to the current data rate observed at the decoder.

25. The method of claim 20, wherein the operations further comprise:
comparing first timestamps indicating when encoded data is transmitted from an encoding endpoint to second timestamps indicating when the encoded data is received by a decoding endpoint; and
selecting the scaling factor according to the comparison.

* * * * *